United States Patent
Harikrishnasamy

(10) Patent No.: US 11,828,525 B2
(45) Date of Patent: Nov. 28, 2023

(54) REINFORCEMENT ASSEMBLY FOR AN INSULATED STRUCTURE

(71) Applicant: WHIRLPOOL CORPORATION, Benton Harbor, MI (US)

(72) Inventor: Arunkumar Harikrishnasamy, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/974,828

(22) Filed: Oct. 27, 2022

(65) Prior Publication Data
US 2023/0052982 A1 Feb. 16, 2023

Related U.S. Application Data

(63) Continuation of application No. 17/138,149, filed on Dec. 30, 2020, now Pat. No. 11,486,627.

(51) Int. Cl.
*F25D 23/06* (2006.01)
*F25D 23/02* (2006.01)

(52) U.S. Cl.
CPC ......... *F25D 23/067* (2013.01); *F25D 23/028* (2013.01); *F25D 23/066* (2013.01); *F25D 2201/14* (2013.01); *F25D 2323/024* (2013.01); *F25D 2323/06* (2013.01); *F25D 2400/06* (2013.01)

(58) Field of Classification Search
CPC .... F25D 23/067; F25D 23/028; F25D 23/066; F25D 2201/14; F25D 2323/024; F25D 2323/06; F25D 2400/06
See application file for complete search history.

(56) References Cited

U.S. PATENT DOCUMENTS

| | | | |
|---|---|---|---|
| 4,822,117 | A | 4/1989 | Boston, Jr. |
| 5,897,181 | A | 4/1999 | Avendano et al. |
| 6,036,293 | A | 3/2000 | Anell et al. |
| 7,014,283 | B2 | 3/2006 | Grace et al. |
| 8,491,070 | B2 | 7/2013 | Davis et al. |
| 8,752,921 | B2 | 6/2014 | Gorz et al. |
| 8,864,253 | B2 | 10/2014 | Gorz et al. |
| 9,322,591 | B2 | 4/2016 | Oh et al. |
| 9,574,819 | B2 | 2/2017 | Kang et al. |
| 9,879,900 | B1 | 1/2018 | Ammerman et al. |
| 10,017,971 | B2 | 7/2018 | Craycraft et al. |
| 10,215,471 | B2 | 2/2019 | Grimm et al. |
| 10,588,428 | B2 | 3/2020 | Park et al. |
| 10,598,424 | B2 | 3/2020 | Dherde et al. |
| 10,697,699 | B2 | 6/2020 | Krishna et al. |
| 10,753,669 | B2 | 8/2020 | Dherde et al. |

(Continued)

FOREIGN PATENT DOCUMENTS

| | | |
|---|---|---|
| CA | 2469167 C | 11/2009 |
| EP | 2789946 A1 | 10/2014 |

(Continued)

*Primary Examiner* — Hanh V Tran
(74) *Attorney, Agent, or Firm* — Price Heneveld LLP

(57) ABSTRACT

An insulated structure for an appliance includes an outer wrapper and an inner liner. A mullion extends across the inner liner. A reinforcement assembly is coupled to the outer wrapper. The reinforcement assembly includes a perimeter frame that is disposed on a peripheral edge of the outer wrapper and a central plate central plate that is proximate the mullion. At least one door is hingedly coupled to the outer wrapper.

19 Claims, 8 Drawing Sheets

(56) References Cited

U.S. PATENT DOCUMENTS

| | | |
|---|---|---|
| 11,221,175 B1 | 1/2022 | Bardouche et al. |
| 2013/0257256 A1 | 10/2013 | Allard et al. |
| 2015/0192355 A1 | 7/2015 | Joo et al. |
| 2016/0334159 A1 | 11/2016 | Hong et al. |
| 2017/0184341 A1 | 6/2017 | Grimm et al. |
| 2018/0156520 A1 | 6/2018 | Lindel et al. |
| 2018/0266754 A1 | 9/2018 | Hottmann |
| 2019/0011174 A1 | 1/2019 | Dherde et al. |
| 2019/0101320 A1 | 4/2019 | Dherde et al. |
| 2019/0154328 A1 | 5/2019 | Dherde et al. |
| 2019/0162356 A1 | 5/2019 | Allard et al. |
| 2019/0269259 A1 | 9/2019 | Park et al. |
| 2020/0173716 A1 | 6/2020 | Choi |
| 2021/0148628 A1 | 5/2021 | Lottinville et al. |

FOREIGN PATENT DOCUMENTS

| | | |
|---|---|---|
| EP | 1957906 B1 | 12/2017 |
| EP | 3339775 A1 | 6/2018 |
| EP | 2789945 B1 | 6/2019 |
| EP | 2789949 B1 | 9/2019 |
| JP | 2013050242 A | 3/2013 |
| JP | 2013119966 A | 6/2013 |
| JP | 2017040432 A | 2/2017 |
| KR | 100744773 B1 | 8/2007 |
| KR | 101346866 B1 | 1/2014 |
| WO | 2017068776 A1 | 4/2017 |
| WO | 2017180126 A1 | 10/2017 |
| WO | 2018070996 A1 | 4/2018 |
| WO | 2019117598 A1 | 6/2019 |
| WO | 2019117599 A1 | 6/2019 |
| WO | 2020122531 A1 | 6/2020 |

REINFORCEMENT ASSEMBLY FOR AN INSULATED STRUCTURE

CROSS-REFERENCE TO RELATED APPLICATION

This application is a continuation of U.S. application Ser. No. 17/138,149, filed on Dec. 30, 2020, now U.S. Pat. No. 11,486,627, entitled "REINFORCEMENT ASSEMBLY FOR AN INSULATED STRUCTURE," the disclosure of which is hereby incorporated herein by reference in its entirety.

BACKGROUND OF THE DISCLOSURE

The present disclosure generally relates to an insulated structure, and more specifically, to a reinforcement assembly for an insulated structure.

SUMMARY OF THE DISCLOSURE

According to one aspect of the present disclosure, an insulated structure for an appliance includes an outer wrapper and an inner liner. A mullion extends across the inner liner. A reinforcement assembly is coupled to the outer wrapper. The reinforcement assembly includes a perimeter frame that is disposed on a peripheral edge of the outer wrapper and a central plate central plate that is proximate the mullion. At least one door is hingedly coupled to the outer wrapper.

According to another aspect of the present disclosure, a vacuum insulated structure for an appliance includes a wrapper that has a peripheral edge. A liner is operably coupled to the wrapper and a mullion extends across the liner. A reinforcement assembly includes a perimeter frame that is operably coupled to the wrapper and a central plate that is operably coupled to the mullion. A trim breaker is operably coupled to the wrapper and the liner, and is disposed along the peripheral edge of the wrapper proximate to the perimeter frame.

According to yet another aspect of the present disclosure, an appliance includes a vacuum insulated structure that includes a wrapper with a peripheral flange and a liner that includes a perimeter flange. A mullion extends across the vacuum insulated structure. A reinforcement assembly is operably coupled to the vacuum insulated structure and the mullion. The reinforcement assembly includes a perimeter frame that is operably coupled to a peripheral edge of the vacuum insulated structure and a central plate that is operably coupled to the mullion. A trim breaker extends over the perimeter frame and conceals the perimeter frame from view.

These and other features, advantages, and objects of the present disclosure will be further understood and appreciated by those skilled in the art by reference to the following specification, claims, and appended drawings.

Figure 1:
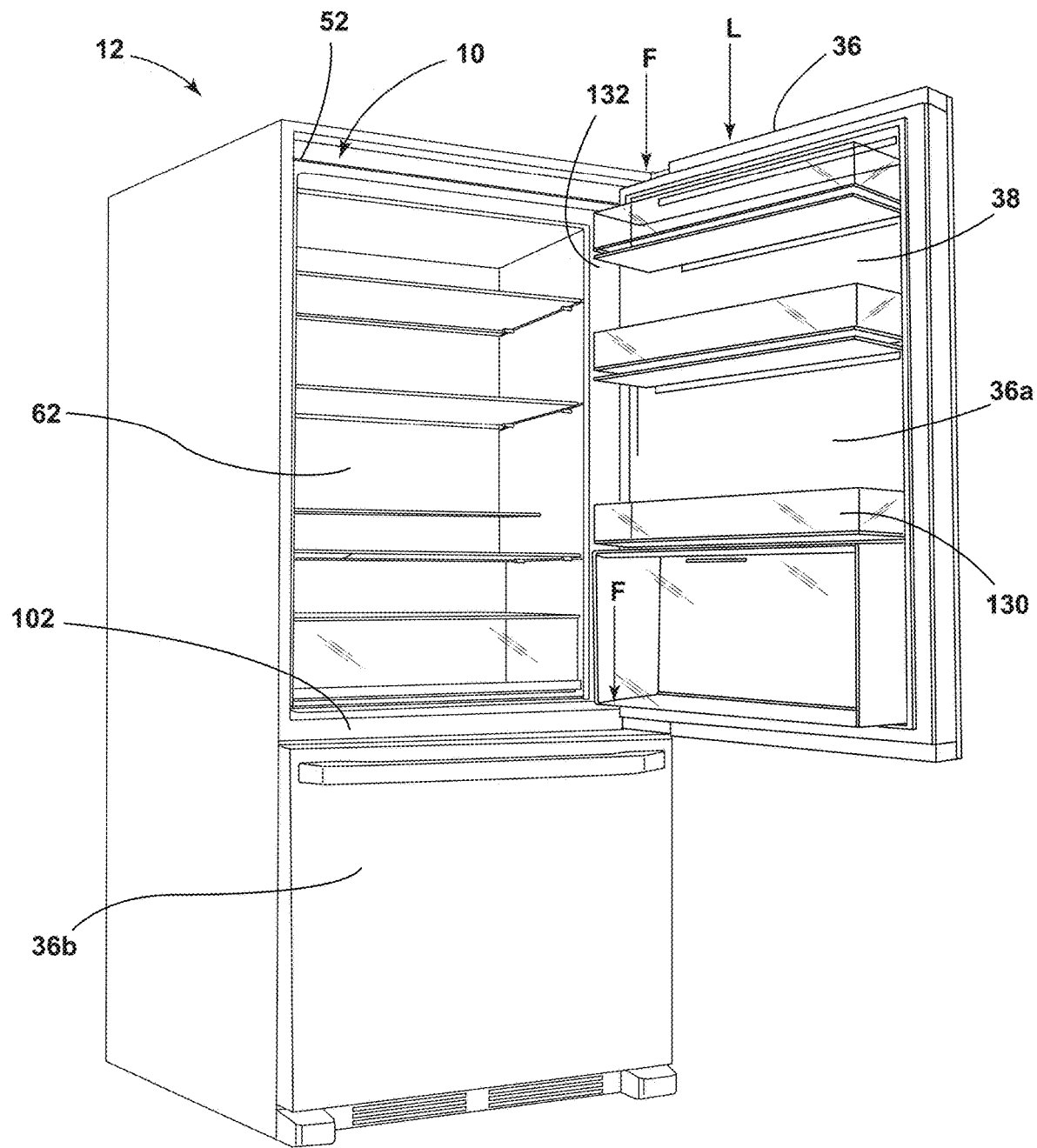
FIG. 1 is a front perspective view of an appliance of the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a reinforcement assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-8, reference numeral 10 generally designates an insulated structure for an appliance 12. The insulated structure 10 includes a wrapper 14 that has an outer surface 16, and an inner surface 18. The wrapper 14 also includes a peripheral edge 20 of each of the outer and inner surfaces 16, 18. A liner 22 has an interior surface 24 and an exterior surface 26 and is operably coupled to the wrapper 14. A mullion 28 is operably coupled to the liner 22 and the wrapper 14. A reinforcement assembly 30 is coupled to the wrapper 14 and includes a perimeter frame 32 disposed on the peripheral edge 20 of the wrapper 14. A central plate 34 is operably coupled to the mullion 28. At least one door 36 includes a body 38. A first hinge 40 is operably coupled to the perimeter frame 32, and a second hinge 42 is operably coupled to the central plate 34.

Referring to FIGS. 1-5, the appliance 12 is illustrated as a refrigerating appliance, but it is also contemplated that the insulated structure 10 described herein may be used with a variety of appliances or insulation purposes other than within an appliance. As mentioned above, the appliance 12 includes at least one door 36, and the appliance 12 is illustrated as having a first door 36a and a second door 36b. Moreover, the insulated structure 10 may be a vacuum insulated structure, such that the insulated structure 10 undergoes evacuation to define a vacuum, as described below. As mentioned above, the insulated structure 10 includes the liner 22 and the wrapper 14. The wrapper 14 and the liner 22 are coupled to a trim breaker 50 to generally define a structural enclosure 52, which further defines an insulating cavity 54 in which one or more insulation materials 56 are disposed. It is generally contemplated that the insulation materials 56 can be a glass-type material, a carbon-based powder, silicon oxide-based materials, insulating gasses, and other standard insulation materials 56 known in the art. The insulation materials 56 substantially fill the insulating cavity 54 forming a substantially continuous layer between the liner 22 and the wrapper 14.

In the depicted insulated structure 10, the wrapper 14 has a three-dimensional shape such that a plurality of panels define a central cavity 58. Correspondingly and as depicted, the liner 22 has a plurality of surfaces defining an inner cavity 60. It is generally contemplated that the liner 22 is received within the central cavity 58 of the wrapper 14 to at least partially define the insulating cavity 54. The liner 22 may be constructed to define a first compartment 62 and a second compartment 64 defined by the trim breaker 50 and separated by the mullion 28. Additionally, the wrapper 14 and the liner 22 can be made from a material at least partially resistant to bending, biasing, or otherwise being formed in resistive to an inward compressive force 66. These materials for the liner 22 and the wrapper 14 may include, but are not limited to, metals, polymers, metal alloys, combinations thereof, and other similar substantially rigid materials that can be used for vacuum insulated structures within appliances.

Referring now to FIGS. 2-6, the reinforcement assembly 30 is operably coupled to at least the outer surface 16 of the wrapper 14 along the peripheral edge 20 of the wrapper and the mullion 28. The wrapper 14 includes a top portion 74, side portions 76, and a bottom portion 78, and it is generally contemplated that the perimeter frame 32 is disposed up on each of the top portion 74, the side portions 76, and the bottom portion 78. The peripheral edge 20 includes a peripheral flange 80 defined, at least in part, by the perimeter frame 32 of the reinforcement assembly 30. The peripheral flange 80 extends outwardly from the perimeter frame 32 and remains generally planar under vacuum pressure. Stated differently, the peripheral flange 80 generally resists the inward force 66 resulting from the insulating cavity 54 of the insulated structure 10 being evacuated. It is generally contemplated that the perimeter frame 32 stabilizes the peripheral flange 80 while the insulated structure 10 is evacuated under vacuum pressure, such that the peripheral flange 80 is reinforced by the perimeter frame 32.

The peripheral flange 80 can include both the outer surface 16 and the inner surface 18 of at least the wrapper 14. It is generally contemplated that the liner 22 includes a perimeter flange 82, which is defined proximate to the peripheral flange 80 of the wrapper 14. The perimeter frame 32 can be securely coupled to the insulated structure 10 to define each of the peripheral flange 80 and the perimeter flange 82 of the wrapper 14 and the liner 22, respectively. By way of example, not limitation, the perimeter frame 32 can be spot welded to the insulated structure 10, such that the perimeter frame 32 can be coupled to both the wrapper 14 and the liner 22.

Figure 6:
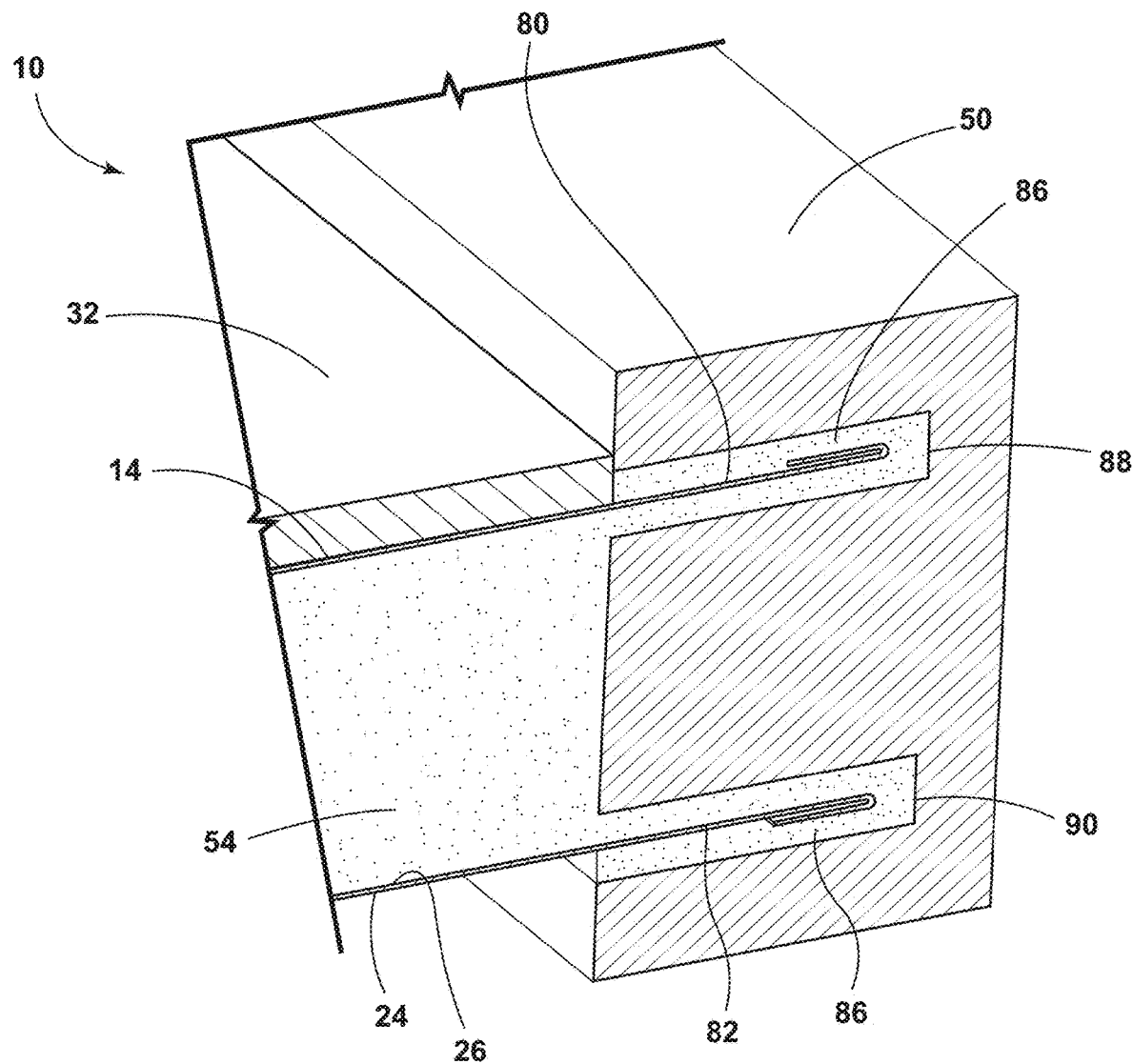
FIG. 6 is an enlarged partial top perspective view of the insulated structure of FIG. 5 taken at area VI with a perimeter frame and a trim breaker of the present disclosure.

With further reference to FIGS. 2-6, the trim breaker 50 is operably coupled to each of the peripheral and perimeter flanges 80, 82 of the insulated structure 10. The trim breaker 50 can be coupled to each of the peripheral and perimeter flanges 80, 82 via an adhesive 86. The adhesive 86 may be disposed within a first groove 88 and a second groove 90 defined by the trim breaker 50. As illustrated in FIG. 6, the peripheral flange 80 of the wrapper 14 can be disposed within the first groove 88, and the perimeter flange 82 of the liner 22 can be disposed within the second groove 90 of the trim breaker 50. Each of the peripheral and perimeter flanges 80, 82 may be operably coupled to the first and second grooves 88, 90, respectively, via the adhesive 86. It is also contemplated that the peripheral flange 80 may be disposed within the second groove 90 and the perimeter flange 82 may be disposed within the first groove 88. The trim breaker 50 is configured to minimize gas permeation of the insulated structure 10 and is typically a generally rectilinear shape to follow a border of the insulated structure 10. It is generally contemplated that the trim breaker 50 can be one continuous piece of material that follows the shape of the insulated structure 10.

By way of example, not limitation, the trim breaker 50 may follow the overall shape and configuration of the insulated structure 10 including the first and second compartments 62, 64 defined by the liner 22. The trim breaker 50, in combination with the metallic liner 22 and wrapper 14, can diminish the overall rate of gas permeation into the insulated structure 10. Thus, the integrity of the insulated structure 10 may be maintained, which ultimately increases the useful life of the insulated structure 10. As mentioned above, the perimeter frame 32 maintains the generally planar configuration of each of the peripheral and perimeter flanges 80, 82. The maintenance of the planar configuration of each of the peripheral and perimeter flanges 80, 82 further maintains the integrity of the insulated structure 10 as each of the peripheral and perimeter flanges 80, 82 remain relatively straight within the trim breaker 50 under vacuum pressure.

Figure 2:
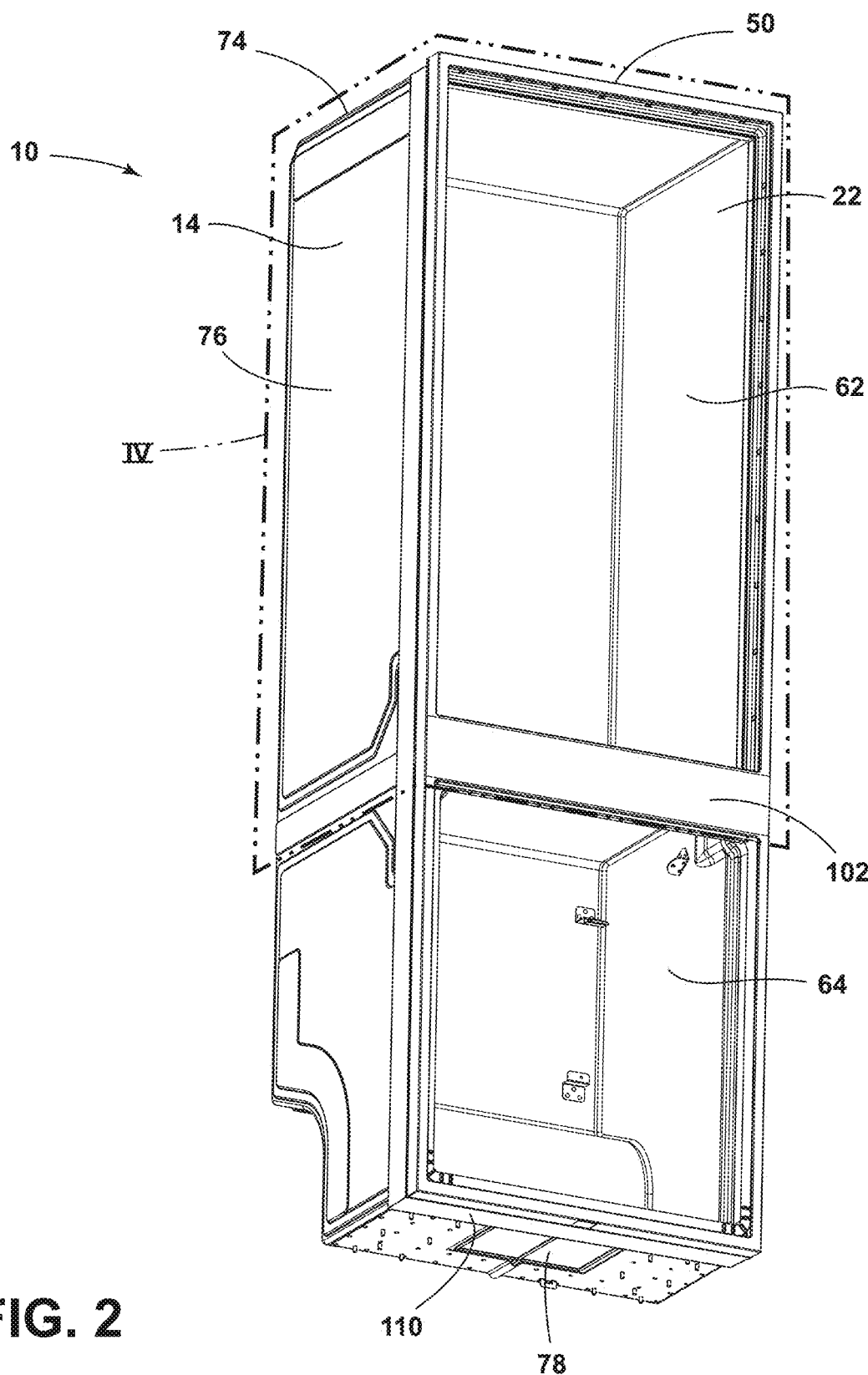
FIG. 2 is a bottom perspective view of an insulated structure of the present disclosure.

With further reference to FIGS. 2-6, the mullion 28 extends between the first compartment 62 and the second compartment 64 of the liner 22 in a horizontal configuration. The mullion 28 is typically disposed between central portions 100 of the trim breaker 50, which are proximate to each of the first and second compartments 62, 64. The mullion 28 is operably coupled to the insulated structure 10 and may be coupled to the liner 22 between the first and second compartments 62, 64, as illustrated in FIG. 2. In this configuration, it is generally contemplated that the mullion 28 is horizontally oriented. Additionally or alternatively, it is also contemplated that the first and second compartments 62, 64 can be positioned to the left and right of a mullion 28 that is vertically oriented.

Figure 3:
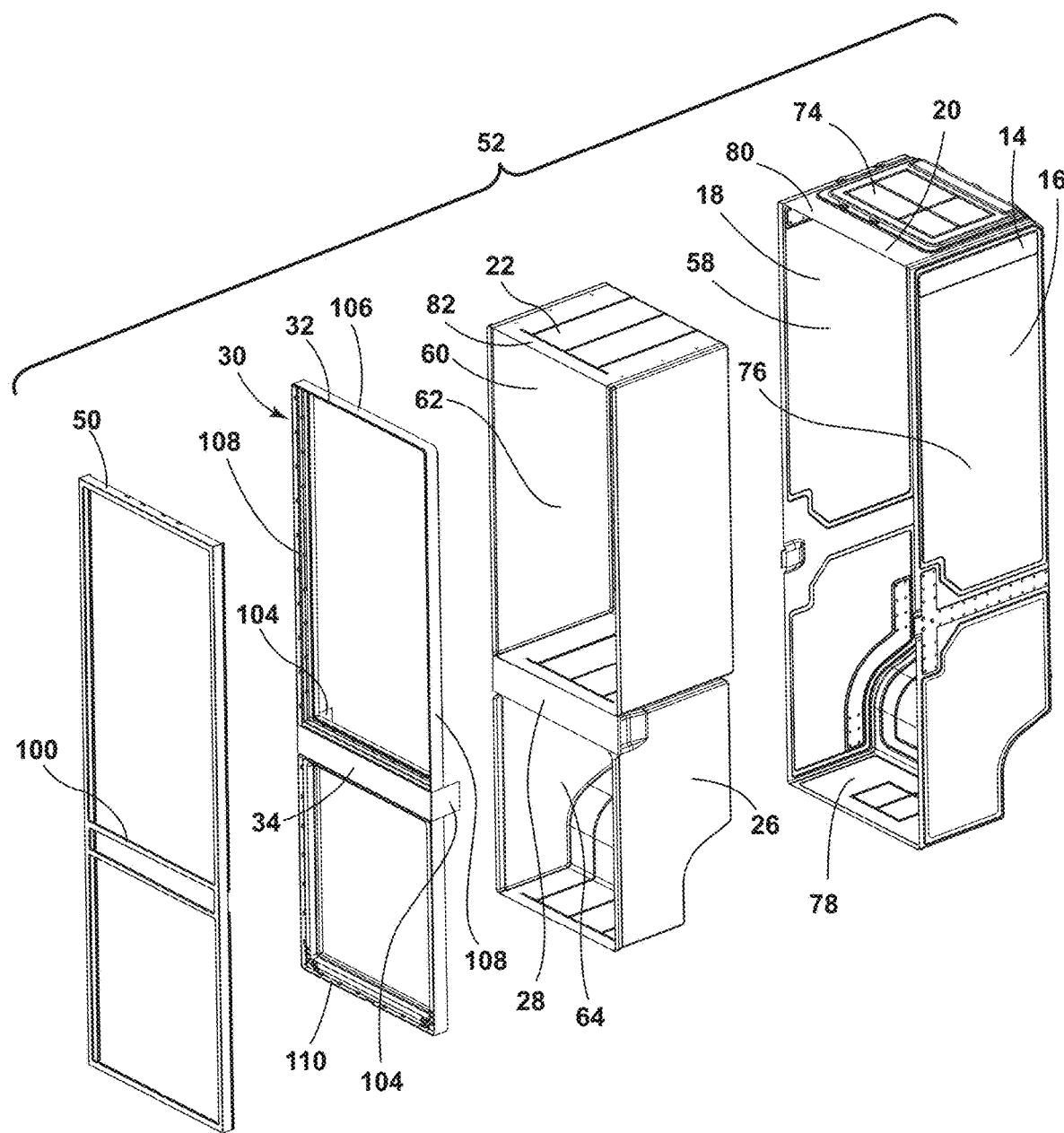
FIG. 3 is an exploded top perspective view of the insulated structure of FIG. 2.
Figure 4:
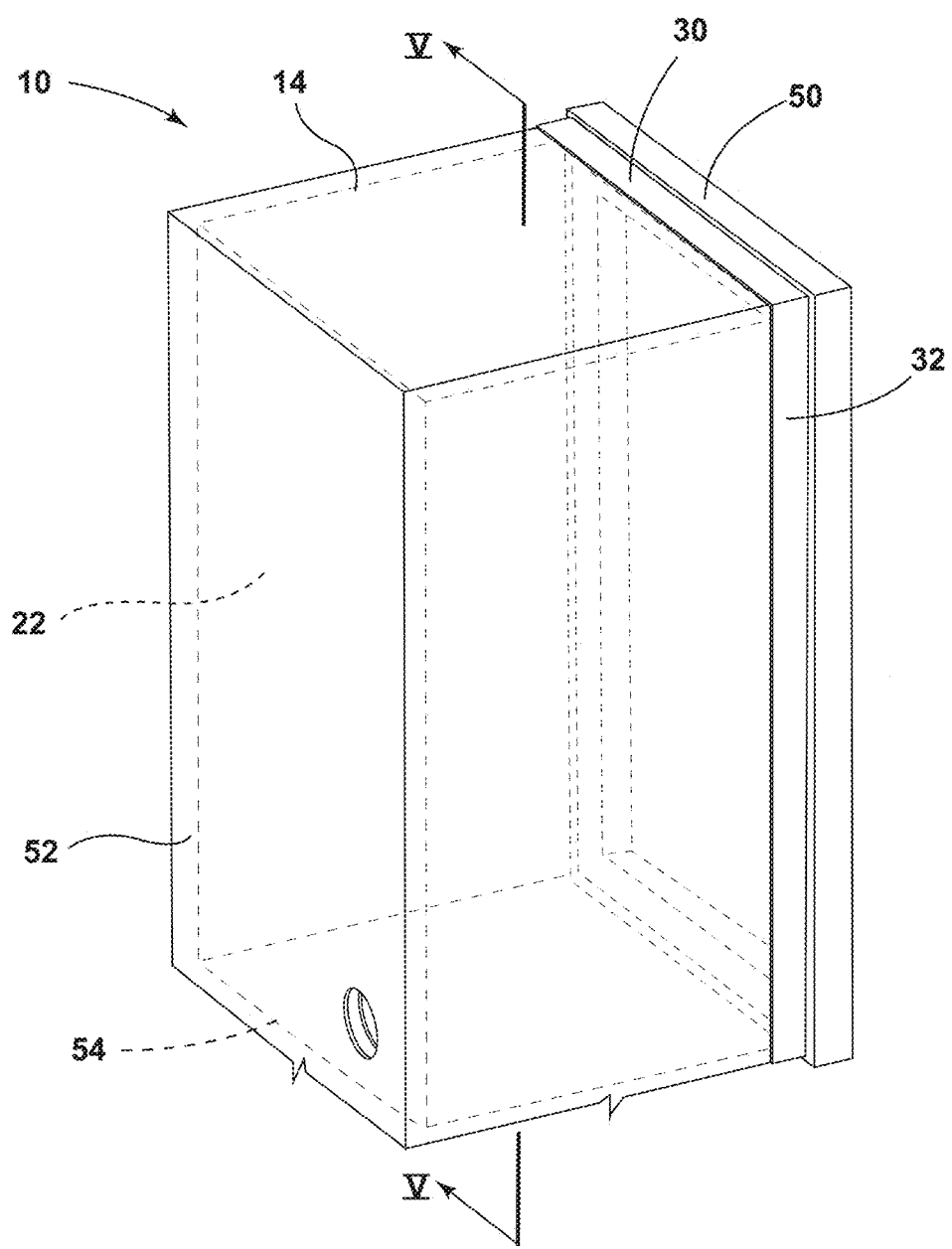
FIG. 4 is a partial rear perspective view of the insulated structure of FIG. 2 taken at area IV.
Figure 5:
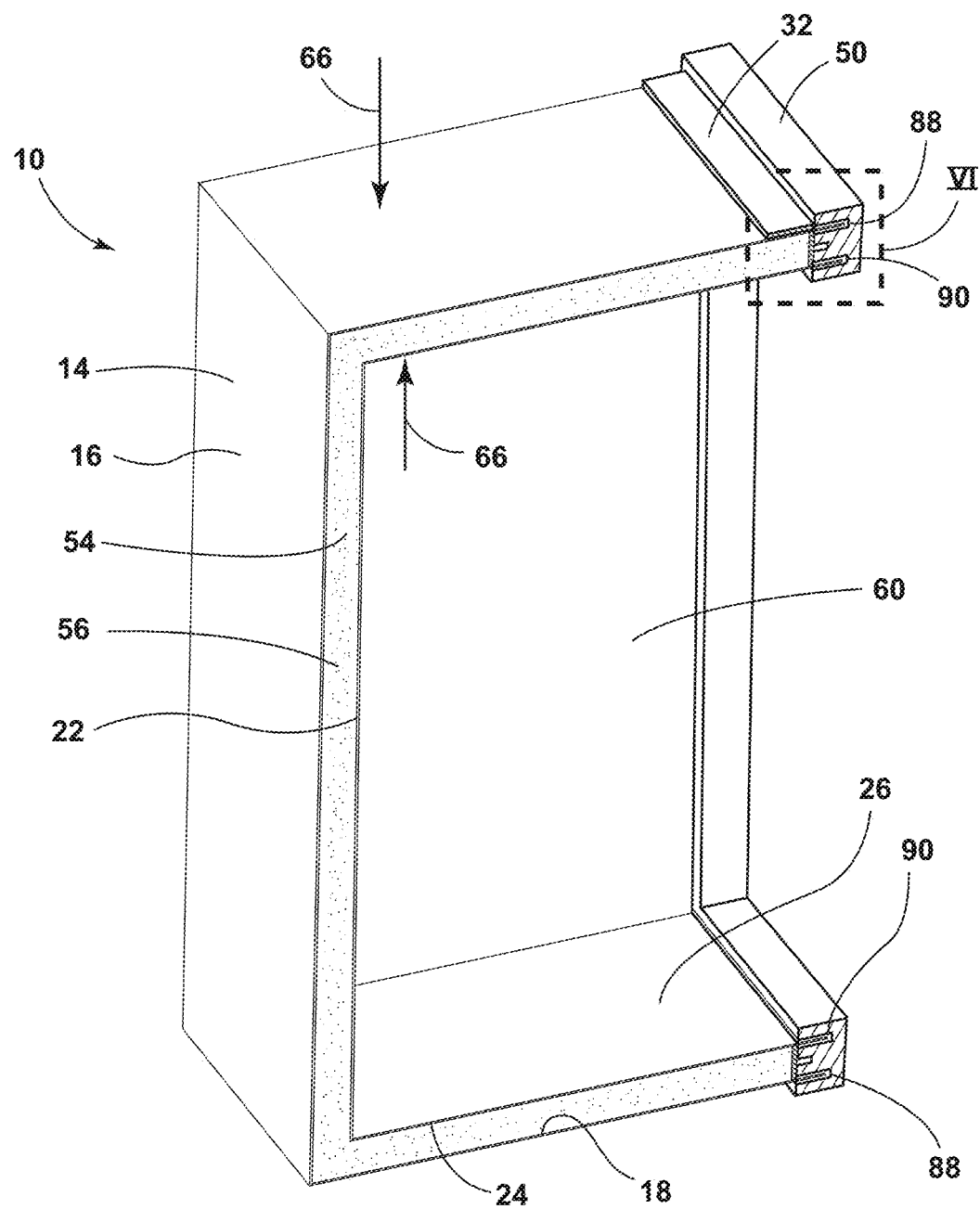
FIG. 5 is a partial cross-sectional view of the insulated structure of FIG. 4 taken along lines V-V.

As mentioned above, the central plate 34 of the reinforcement assembly 30 is operably coupled to the mullion 28 between the central portions 100 of the trim breaker 50. As illustrated in FIG. 1, the central plate 34 is concealed by a cover 102 coupled to the appliance 12. The central plate 34 generally provides additional structural reinforcement for the insulated structure 10, such that the central plate 34 may be integrally formed with the perimeter frame 32. Additionally or alternatively, the central plate 34 can be spot-welded or otherwise securely coupled to the perimeter frame 32 to form the reinforcement assembly 30. The central plate 34 includes attachment plates 104 that can be either coupled to or integrally formed with the perimeter frame 32. As illustrated in FIGS. 2 and 3, the attachment plates 104 span each of the peripheral and perimeter flanges 80, 82 of the insulated structure 10 to couple to the perimeter frame 32 as the perimeter frame 32 is set back from, at least, the peripheral flange 80. The attachment plates 104 and the perimeter frame 32 reinforce the side portions 76 of the insulated structure 10, as described further below. In either configuration, the central plate 34 centrally braces the reinforcement assembly 30 to reinforce the insulated structure 10 at least during the evacuation of the insulation cavity 54. Stated differently, the central plate 34 may provide additional support for the liner 22 in addition to the trim breaker 50 during the evacuation process of the insulated structure 10.

Referring still to FIGS. 2-6, it is generally contemplated that the perimeter frame 32 of the reinforcement assembly 30 includes a top plate 106, first and second side plates 108, and a bottom plate 110. The central plate 34 is operably coupled to the side plates 108 via the attachment plates 104 to form the reinforcement assembly 30 along with the perimeter frame 32. The top plate 106, side plates 108, and the bottom plate 110 of the perimeter frame 32 are all integrally formed to define a single, unitary construction. The reinforcement assembly 30 may similarly be defined as a monolithic body that includes the perimeter frame 32 and the central plate 34. The unitary configuration of the reinforcement assembly 30 provides added structural strength to the overall insulated structure 10. Specifically, the reinforcement assembly 30 is configured to evenly distribute a load L (FIG. 1) of each of the first and second doors 36a, 36b, (FIG. 1) as described in further detail below.

With reference now to FIGS. 1 and 5-8 and as mentioned above, the first and second doors 36a, 36b of the appliance 12 are operably coupled to the insulated structure 10 via the reinforcement assembly 30. The first and second doors 36a, 36b are operably coupled to the insulated structure 10 via a plurality of hinges 120. The plurality of hinges 120 are operably coupled to the reinforcement assembly 30, as described further below. The plurality of hinges 120 include a first pair of hinges 122 and a second pair of hinges 124. It is generally contemplated that the first pair of hinges 122 are configured to support the first door 36a proximate to the first compartment 62, and the second pair of hinges 124 are configured to support the second door 36b proximate to the second compartment 64.

Figure 7:
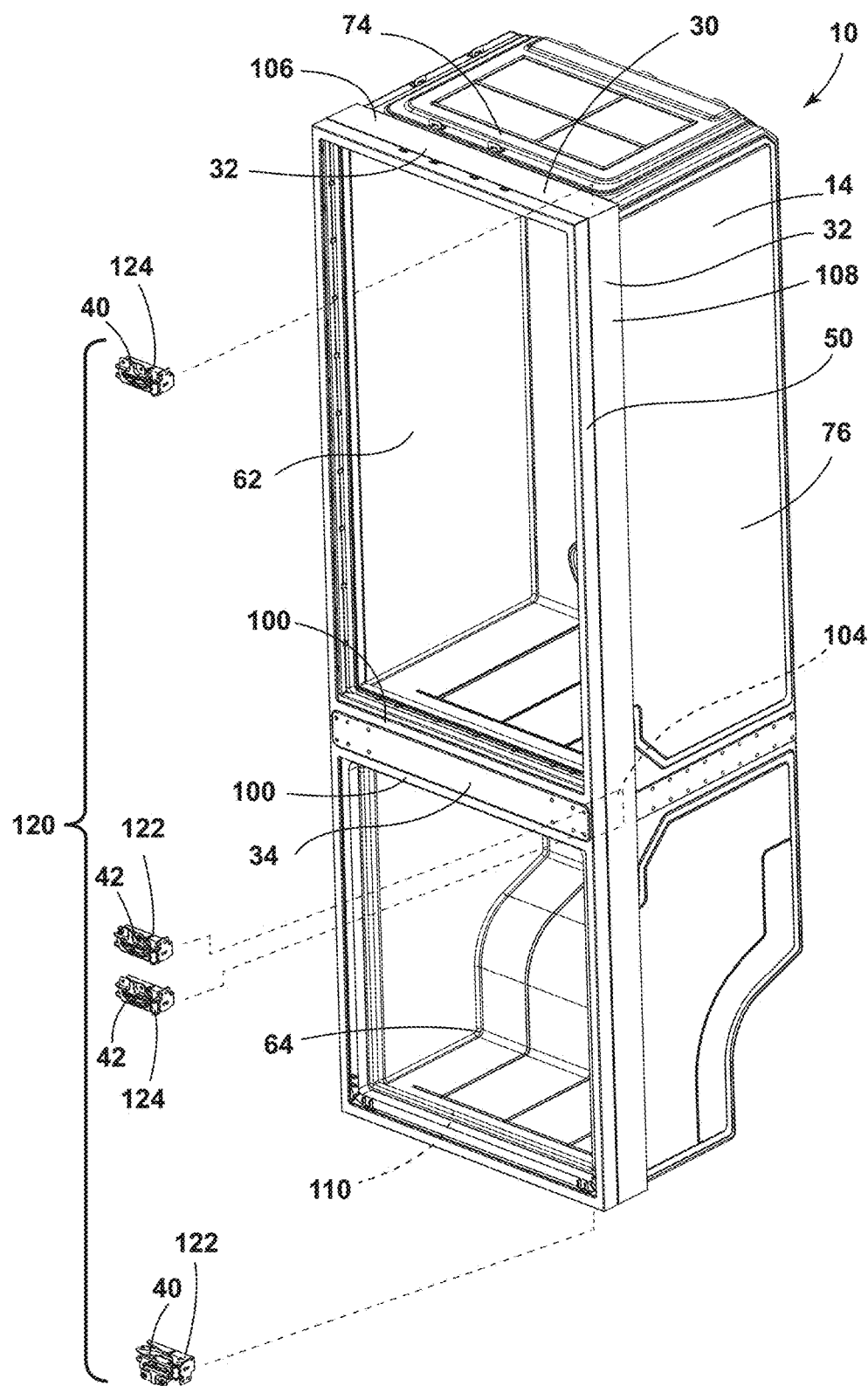
FIG. 7 is a top perspective view of an insulated structure with a reinforcement assembly of the present disclosure and a plurality of hinges.
Figure 8:
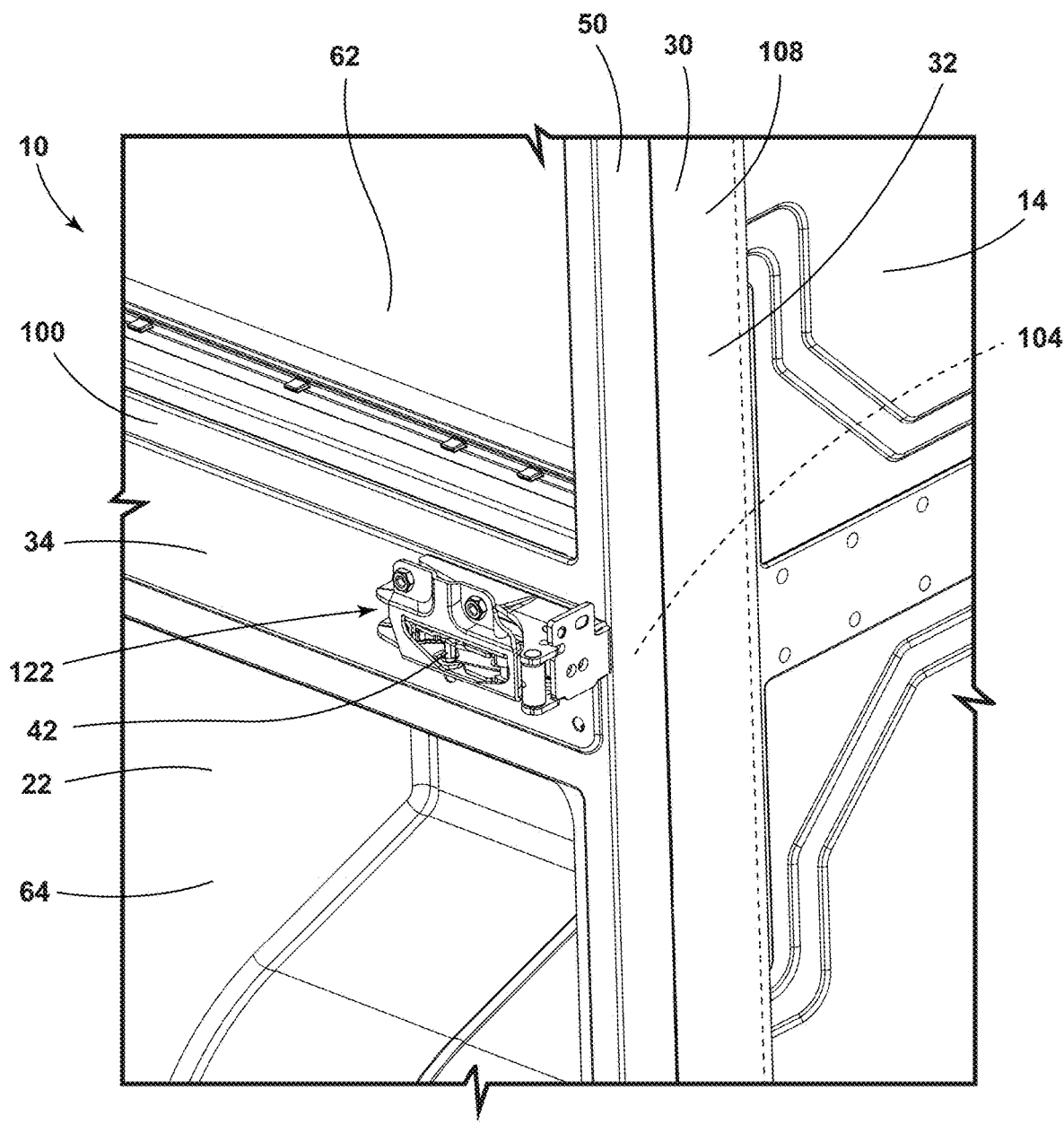
FIG. 8 is an enlarged side perspective view of a hinge and a reinforcement assembly of the present disclosure taken.

Both of the first and second pairs of hinges 122, 124 include the first hinge 40 and the second hinge 42, mentioned above. As illustrated in FIG. 7, the first hinges 40 are configured to operably couple to the perimeter frame 32 of the reinforcement assembly 30. The second hinges 42 of the first pair of hinges 122 and the second pair of hinges 124 are illustrated as being operably coupled to the central plate 34 of the reinforcement assembly 30. Additionally or alternatively, the position of each of the first and second hinges 40, 42 may be interchanged, such that the first hinges 40 may be disposed on the central plate 34 and the second hinges 42 may be disposed on the perimeter frame 32.

With further reference to FIGS. 1 and 5-8, the first hinges 40 coupled to the top and bottom plates 106, 110 of the perimeter frame 32, respectively. Stated differently, the first hinges 40 are generally disposed on the top portion 74 and the bottom portion 78 of the insulated structure 10 by coupling to the top and bottom plates 106, 110 of the perimeter frame 32, respectively. The second hinges 42 can be operably coupled to the central plate 34 of the reinforcement assembly 30 proximate to each of the first and second compartments 62, 64. The first and second doors 36a, 36b are each operably coupled to the first and second hinges 40, 42. The first and second doors 36a, 36b are configured to hingedly rotate relative to the insulated structure 10 to provide selective access to each of the first and second compartments 62, 64 via the first and second hinges 40, 42.

As mentioned above, the first and second doors 36a, 36b define the load L that is applied to the insulated structure 10. The reinforcement assembly 30 is configured to offset the load L defined by the first and second doors 36a, 36b. By way of example, not limitation, the perimeter frame 32 and the central plate 34 cooperate to redistribute the load L along the reinforcement assembly 30 to alleviate the load L placed upon the insulated structure 10. The side plates 108 of the perimeter frame 32, mentioned above, advantageously absorb at least a portion of the load L applied on the top and bottom plates 106, 110 of the perimeter frame 32. Similarly, the side plates 108 cooperate with the top and bottom plates 106, 110 to redistribute and absorb at least a portion of the load L distributed along the central plate 34.

Over time, the load L of the doors 36a, 36b may vary, such that the load L may, for example, increase as a user adds items to support bins 130 disposed on the body 38 of each of the doors 36a, 36b. The body 38 of the doors 36a, 36b typically applies a force F to each of the first and second hinges 40, 42 that is generally relative to the load L of the respective door 36a, 36b. The first and second hinges 40, 42 can transfer the force F applied by the doors 36a, 36b to the reinforcement assembly 30, which ultimately extends the useful life of the insulated structure 10. For example, the reinforcement assembly 30, rather than the insulated structure 10, absorbs the force F from the load L of the doors 36a, 36b. The insulated structure 10 may still accommodate a portion of the load L of the doors 36a, 36b, but the reinforcement assembly 30 provides advantageous support and redistribution of the load such that load L placed upon the insulated structure 10 is minimized.

With further reference to FIGS. 1 and 5-8, the even distribution of the load L of the doors 36a, 36b by the reinforcement assembly is configured to minimize potential misalignment of the doors 36a, 36b over time due to the force F acting upon the doors 36a, 36b in, at least, an open position 132 of the doors 36a, 36b. The first and second hinges 40, 42 are configured to engage the top plate 106, the bottom plate 110, and the central plate 34 with the load L of the doors 36a, 36b. The load L can then be distributed along the side plates 108 of the perimeter frame 32 to maintain the overall balance of the doors 36a, 36b relative to the appliance 12. The side plates 108 redistribute the load L from the top plate 106, the bottom plate 110, and the central plate 34 along the reinforcement assembly 30, such that the alignment of the doors 36a, 36b can be maintained over time to increase the overall useful life of the appliance 12 and the insulated structure 10.

The side plates 108 reinforce the wrapper 14 to balance the load L along the side portions 76 of the insulated structure 10. Stated differently, the side plates 108 minimize the overall load L applied to the insulated structure 10. In addition, the positioning of the perimeter frame 32 along the peripheral edge 20 of the wrapper 14 reinforces the structural integrity of the wrapper 14 due to the rigid configuration of the perimeter frame 32. It is generally contemplated that the reinforcement assembly 30 can be formed from a metallic material or other structurally rigid material generally known in the art.

As mentioned above, the rigidity of the perimeter frame 32 maintains the planar configuration of the peripheral flange 80 of the wrapper 14. In addition, the positioning of the perimeter frame 32 inward along the peripheral edge 20 of the wrapper 14 further supports the wrapper 14 by bracing a more central portion of the wrapper 14 as compared to the peripheral flange 80 that is defined by the perimeter frame 32. The perimeter frame 32 is advantageously positioned proximate to the peripheral edge 20 of the wrapper 14, while being positioned deep enough along the top portion 74, the side portions 76, and the bottom portion 78 (FIG. 2) of the wrapper 14 to reinforce the insulated structure 10.

Referring again to FIGS. 1-8, the reinforcement assembly 30 maintains the overall alignment of the doors 36a, 36b relative to the appliance 12 and provides structural support for the insulated structure 10. As described above, the side plates 108 assist in balancing the load L of the doors 36a, 36b along with the top plate 106 and the bottom plate 110. Further, the central plate 34 being coupled to and/or integrally formed with the perimeter frame 32 reinforces the insulated structure 10. The structural reinforcement of the entire reinforcement assembly 30 cooperates with the trim breaker 50 to maintain the planar configuration of, at least, the peripheral flange 80, which extends the overall useful life of the insulated structure 10 as there is minimized bending or other alteration of the peripheral edge 20 of the wrapper 14 under vacuum pressure.

The invention disclosed herein is further summarized in the following paragraphs and is further characterized by combinations of any and all of the various aspects described therein.

According to one aspect of the present disclosure, an insulated structure for an appliance includes a wrapper that has an outer surface, an inner surface, and a peripheral edge defined by each of the outer and inner surfaces. A liner has an interior surface and an exterior surface. The liner is operable coupled to the wrapper. A mullion is operably coupled to the liner. A reinforcement assembly is coupled to the wrapper. The reinforcement assembly includes a perimeter frame that is disposed on the peripheral edge of the wrapper, and a central plate that is operably coupled to the mullion. At least one door includes a body, a first hinge that is operably coupled to the perimeter frame, and a second hinge that is operably coupled to the central plate.

According to another aspect, a reinforcement assembly is configured to evenly distribute a load of at least one door.

According to another aspect, a perimeter frame and a central plate are configured to minimize misalignment of at least one door over time.

According to another aspect, an outer surface of a wrapper includes a top portion, side portions, and a bottom portion. A perimeter frame is operably coupled to at least the top portion and the bottom portion of the outer surface.

According to another aspect, a central plate is operably coupled to side portions of an outer surface of a wrapper.

According to another aspect, at least one door includes a first door and a second door. The first door is coupled to a perimeter frame at a top portion of a wrapper, and the second door is coupled to the perimeter frame at a bottom portion of the wrapper.

According to another aspect, an insulated structure further includes a trim breaker that is operably coupled to a wrapper and a liner. The trim breaker is disposed along a peripheral edge of the wrapper and is proximate to a perimeter frame.

According to another aspect of the present disclosure, a vacuum insulated structure for an appliance includes a wrapper that has a peripheral edge, a liner that is operably coupled to the wrapper, and a mullion operably coupled to the liner. The reinforcement assembly includes a perimeter frame that is operably coupled to the wrapper. The perimeter frame includes a top plate, side plates, and a bottom plate. The reinforcement assembly further includes a central plate that is operably coupled to the mullion.

According to another aspect, a central plate is integrally formed with side plates of a perimeter frame.

According to another aspect, a vacuum insulated structure further includes a door that is operably coupled to a reinforcement assembly.

According to another aspect, a door includes a first hinge and a second hinge. The first hinge is operably coupled to a perimeter frame and a second hinge is operably coupled to a central plate.

According to another aspect, side plates are configured to reinforce a wrapper.

According to another aspect, a perimeter frame is coupled to a peripheral edge of a wrapper to define a peripheral flange of a wrapper.

According to another aspect, a perimeter frame is constructed from a rigid material to maintain a planar configuration of a peripheral flange of a wrapper.

According to yet another aspect of the present disclosure, an appliance includes a vacuum insulated structure that has a peripheral edge and includes a wrapper and a liner. A mullion is operably coupled to the vacuum insulated structure. A reinforcement assembly is operably coupled to the vacuum insulated structure and the mullion. The reinforcement assembly includes a perimeter frame that is operably coupled to the peripheral edge of the vacuum insulated structure, and a central plate that is operably coupled to the mullion. A door is operably coupled to the reinforcement assembly.

According to another aspect, a perimeter frame includes a top plate, side plates, and a bottom plate. The side plates are configured to reinforce a vacuum insulated structure.

According to another aspect, a door defines a load that is relative to a vacuum insulated structure. Side plates of a perimeter frame minimize the load that is applied to the vacuum insulated structure.

According to another aspect, a door includes a first hinge and a second hinge. The first hinge is operably coupled to a perimeter frame and a second hinge is operably coupled to a central plate.

According to another aspect, a central plate is integrally formed with a perimeter frame.

According to another aspect, a perimeter frame is operably coupled to a vacuum insulated structure to define a peripheral flange. The peripheral flange is planar under vacuum pressure.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An insulated structure for an appliance, comprising:
   an outer wrapper;
   an inner liner;
   a mullion extending across the inner liner;
   a reinforcement assembly coupled to the outer wrapper, the reinforcement assembly including:
     a perimeter frame disposed on a peripheral edge of the outer wrapper, wherein the perimeter frame is directly coupled to at least a top portion and a bottom portion of an outer surface of the outer wrapper; and
     a central plate proximate the mullion; and
   at least one door hingedly coupled to the outer wrapper.

2. The insulated structure of claim 1, wherein the at least one door is hingedly coupled to the perimeter frame and the outer wrapper.

3. The insulated structure of claim 2, wherein the reinforcement assembly is configured to evenly distribute a load of the at least one door.

4. The insulated structure of claim 1, wherein the central plate is operably coupled to side portions of the outer surface of the outer wrapper.

5. The insulated structure of claim 1, wherein the at least one door includes a first door and a second door, and wherein the first door is coupled to the perimeter frame at the top portion of the outer wrapper and the second door is coupled to the perimeter frame at the bottom portion of the outer wrapper.

6. The insulated structure of claim 1, further comprising:
   a trim breaker operably coupled to the outer wrapper and the inner liner, wherein the trim breaker is disposed along the peripheral edge of the outer wrapper proximate to the perimeter frame.

7. A vacuum insulated structure for an appliance, comprising:
   a wrapper having a peripheral edge;
   a liner operably coupled to the wrapper to define an insulated structure therebetween that is under vacuum pressure;
   a mullion extending across the liner;
   a reinforcement assembly defining a single monolithic body, the reinforcement assembly including:
     a perimeter frame operably coupled to an outer surface of the wrapper; and
     a central plate operably coupled to the mullion; and
   a trim breaker operably coupled to the wrapper and the liner, wherein the trim breaker is disposed along the peripheral edge of the wrapper proximate to the perimeter frame.

8. The vacuum insulated structure of claim 7, wherein the perimeter frame is coupled to the peripheral edge of the wrapper to define a peripheral flange of the wrapper.

9. The vacuum insulated structure of claim 8, wherein the perimeter frame is constructed from a rigid material to maintain a planar configuration of the peripheral flange of the wrapper.

10. The vacuum insulated structure of claim 7, wherein the perimeter frame further comprises side plates, the side plates of the perimeter frame are configured to reinforce the wrapper.

11. The vacuum insulated structure of claim 7, further comprising:
    a door hingedly coupled to the reinforcement assembly.

12. The vacuum insulated structure of claim 11, wherein the door includes a first hinge and a second hinge, and wherein the first hinge is operably coupled to the perimeter frame and the second hinge is operably coupled to the central plate.

13. The vacuum insulated structure of claim 10, wherein the central plate is integrally formed with the side plates of the perimeter frame.

14. An appliance comprising:
    a vacuum insulated structure including a metallic wrapper with a peripheral flange and a metallic liner that includes a perimeter flange;
    a mullion extending across the vacuum insulated structure; and
    a reinforcement assembly operably coupled to the vacuum insulated structure and the mullion, the reinforcement assembly having a single unitary construction and including:
      a perimeter frame operably coupled to an outer surface of the peripheral flange of the metallic wrapper;
      a central plate operably coupled to the mullion; and
      a trim breaker extending over the perimeter frame, concealing the perimeter frame from view.

15. The appliance of claim 14, further comprising:
    a door operably coupled to the reinforcement assembly.

16. The appliance of claim 14, wherein the trim breaker is operably coupled to each of the peripheral flange and the perimeter flange of the vacuum insulated structure.

17. The appliance of claim 14, wherein an adhesive is disposed within a first groove and a second groove defined by the trim breaker.

18. The appliance of claim 17, wherein each of the peripheral flange and the perimeter flange are operably coupled to the first groove and the second groove, respectively, via the adhesive.

19. The appliance of claim 14, wherein the trim breaker is one continuous piece of material that follows a shape of the vacuum insulated structure.

\* \* \* \* \*